March 8, 1966    I. D. PRESS ETAL    3,239,245
GEAR POWERED THREADED UNION
Filed July 16, 1964    3 Sheets-Sheet 1

INVENTORS
IRVING D. PRESS
HELMUT A. RINK
BY
Byerly, Townsend, Watson & Churchill
ATTORNEYS.

March 8, 1966     I. D. PRESS ETAL     3,239,245

GEAR POWERED THREADED UNION

Filed July 16, 1964     3 Sheets-Sheet 2

INVENTORS
IRVING D. PRESS
HELMUT A. RINK

BY Byerly, Townsend, Watson & Churchill

ATTORNEYS.

March 8, 1966  I. D. PRESS ETAL  3,239,245
GEAR POWERED THREADED UNION

Filed July 16, 1964  3 Sheets-Sheet 3

INVENTORS
IRVING D. PRESS
HELMUT A. RINK
BY

Byerly, Townsend, Watson & Churchill
ATTORNEYS.

United States Patent Office 3,239,245
Patented Mar. 8, 1966

3,239,245
GEAR POWERED THREADED UNION
Irving D. Press, West Orange, and Helmut A. Rink, North Haledon, N.J., assignors to Resistoflex Corporation, Roseland, N.J., a corporation of New York
Filed July 16, 1964, Ser. No. 384,283
20 Claims. (Cl. 285—18)

This application is a continuation-in-part of our prior application, Serial No. 37,484, filed June 20, 1960 and now abandoned.

The present invention relates to pipe joints or couplings and especially to couplings for large size piping.

The standard for small size piping is the conventional threaded union consisting of a flanged nut for drawing together a pair of union members attached, respectively, to the ends of the pipes to be joined. The nature of a threaded union is such that when properly tightened sufficient friction is developed between the mating threads to preclude loosening in the face of strong vibration. However, as the size of the conventional threaded union increases it becomes necessary to use larger and heavier wrenches until it becomes impractical to develop sufficient tightening torque to ensure that the unions will not vibrate loose. It is for this reason that flange joints are generally used on larger size pipes.

In certain applications, such as on aircraft, both space and weight are at a premium. There generally is little or no room to maneuver large wrenches and the conventional threaded union cannot be used. On the other hand, flange joints require a much greater envelope size, are tedious to assemble and disassemble, and, where high pressures are present, give rise to sealing problems.

Another type of pipe joint which is often used for its ease of assembly and disassembly is that employing a V-band clamp. However, unless the clamp is made extremely heavy it is liable to rupture under heavy static and dynamic stress resulting in gross joint separation and failure.

In the petroleum industry where size and weight is of little concern, bayonet type joints have been employed and various devices have been resorted to in order to develop the necessary tightening and loosening torques.

All of the many pipe joints presently known have certain inherent advantages coupled with a number of basic disadvantages. The purpose of the present invention is to combine the advantages while avoiding the disadvantages in order to provide a versatile pipe joint primarily for large size pipe which can be assembled and disassembled with a small standard wrench, can withstand working pressures in excess of 6,000 p.s.i., employs replaceable seals resistant to the effects of metal fatigue and creep, is light in weight, and has a small envelope size, as well as other advantages.

In accordance with the present invention there is provided in a pipe coupling having a flanged nut mounted on a flanged coupling member for drawing the latter into sealing or coupled position relative to an externally threaded coupling member, the improvement comprising threaded operating means operatively carried by the nut, and a gear toothed element joined to the threaded coupling member, the threaded means engaging the gear element when the nut and threaded coupling member are threadedly engaged for turning the nut and the threaded coupling member in opposite directions relative to each other to either tighten or loosen the coupling.

A preferred embodiment of the invention employs a metallic sealing ring, and it has been found that with such rings it is important for reusability that each time the joint is taken apart and reassembled the seal aligns with the same "footprint." It has been found that if this precaution is not taken there is a great likelihood that leakage will develop upon replacing a seal.

Therefore, in accordance with a further aspect of the invention there is provided a pipe coupling comprising a member for connection to each pipe end, means for drawing the members into sealing or coupled position relative to each other, and a metal sealing ring with both rigid and resilient sealing surfaces for disposition between the two members, or between adjacent pipe ends, preferably the two members and the ring being provided with complementary surfaces for piloting the ring into predetermined position relative to the members.

The invention will be better understood after reading the detailed description which follows with reference to the appended drawings in which.

Reference should now be had to FIGS. 1 to 6 of the drawing wherein the same reference numerals are used to designate the same or similar parts.

Figure 1:
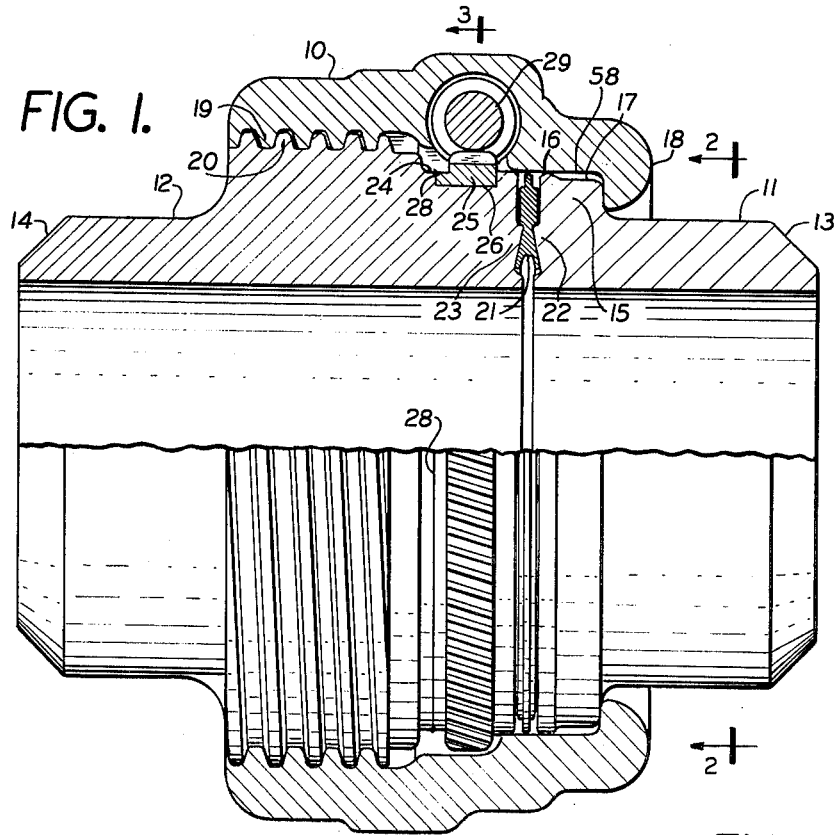
FIG. 1 is a longitudinal quarter sectional view with additional portions broken away of a pipe coupling in fully asembled position representing one embodiment of the subject invention.

A flanged nut 10 is mounted on a flanged coupling member 11 for drawing the latter into sealing position relative to the externally threaded hollow cylindrical coupling member 12. For purpose of illustration, the coupling members 11 and 12 are each provided with the chamfered end surfaces 13 and 14 for adapting the coupling members to be butt welded to the respective pipe ends. Alternatively these members could be internally threaded for threaded engagement with the pipe ends.

The coupling member 11 is provided with an enlarged flange 15 having a forward portion 16 and a slightly reduced portion 17. The nut 10 is provided with a flange 18 which is disposed behind the enlarged flange 15 of the coupling member 11 for drawing the latter into sealing position relative to the other coupling member 12. The opposite end of the nut 10 is internally threaded at 19 for telescoping and threaded engagement with the threads 20 on the coupling member 12.

The metallic seal is shown at 21 sandwiched between the ends 22 and 23, respectively, of the coupling members 11 and 12.

As seen in the drawing, the externally threaded coupling member 12 is provided with an unthreaded portion 24 of slightly reduced diameter. The unthreaded portion is adjacent to the seal engaging end 23. A toothed portion in the form of a gear ring 25 is circumferentially disposed about the coupling member 12 between the external threads 20 and the seal engaging end 23 within the unthreaded portion 24.

Although it is possible to form the gear integral with the coupling member 12, it is preferred to provide the coupling member with a circumferential channel 26. The annular gear element 25 is then provided in the form of a split ring which can be spread and forced over the end 23 of the member 12 until it slips into the channel 26. The split in the ring is better seen in FIG. 3 at 27. After the ring is in place the split 27 may be tack welded while the ring is circumferentially tack welded to the member 12 along the line 28.

Figure 2:
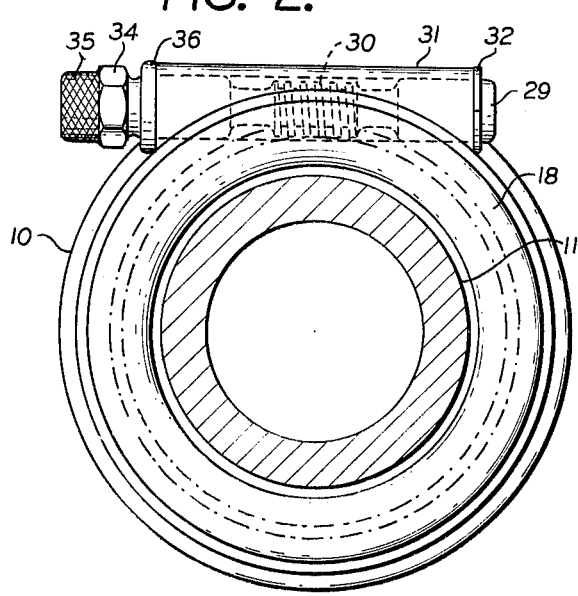
FIG. 2 is a transverse sectional view taken on line 2—2 in FIG. 1.
Figure 3:
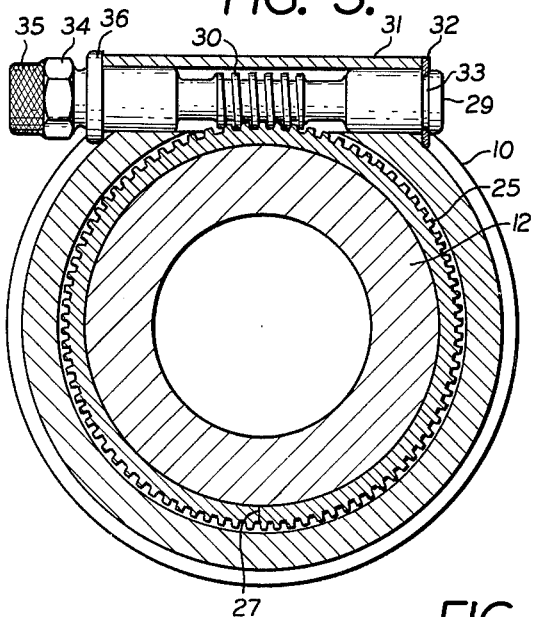
FIG. 3 is a transverse sectional view taken on line 3—3 in FIG. 1.
Figure 5:
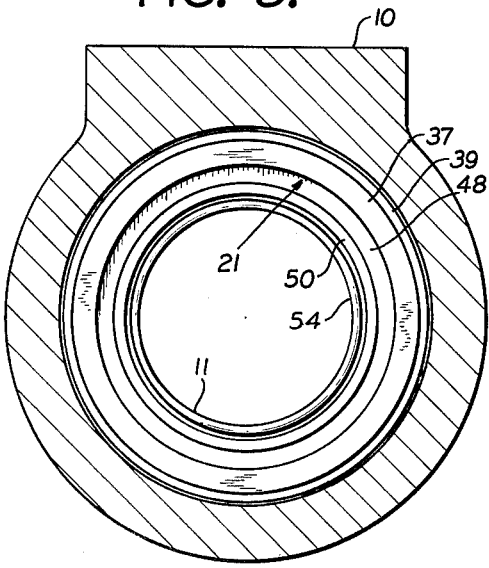
FIG. 5 is a transverse sectional view taken on line 5—5 in FIG. 4.

The threaded operating means, previously referred to, takes the form of a transversely disposed spindle 29 threaded over its mid-section at 30 and journalled in an enlarged portion or housing 31 of the nut 10 near the flange 18 thereof. As best seen in FIGS. 2 and 3, a split ring such as a "Truarc" retaining ring 32 is disposed in the annular groove 33 to retain the spindle 29 within the housing 31 of the nut. The spindle extends to the exterior of the nut on the opposite end and may be provided with tool engaging means such as the wrench flats 34. For convenience during initial stages of assembly, the end of the spindle may also be provided with the knurled portion 35.

Figure 4:
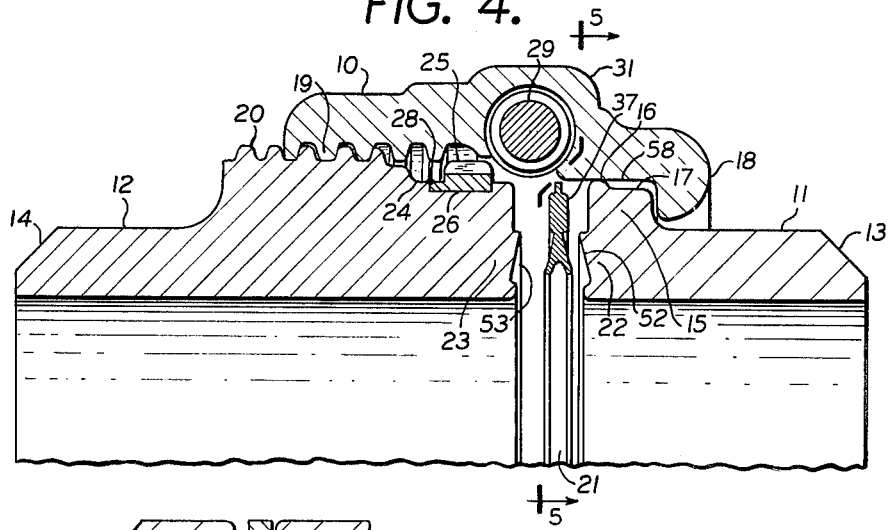
FIG. 4 is a fragmentary longitudinal sectional view of the fitting illustrated in FIG. 1, but with the parts partially disassembled.

As seen in the drawings, the threaded spindle is arranged for tangential meshing with the toothed portion 25 secured to the threaded coupling member 12 when the nut 10 and the member 12 are threadedly engaged. It will be appreciated from a consideration of FIG. 4 that the nut 10 can have its threads 19 engaged with the threads 20 on the member 12 and be advanced by hand until the joint is partially assembled. At some point the threads 30 on the spindle 29 will encounter the lateral edge of the gear portion 25. Continued rotation of the spindle by hand will advance the nut 10 with respect to the coupling member 12 until the coupling members 11 and 12 are just about to compress the seal 21. This position is represented in the left portion of FIG. 6. Now, a wrench may be applied to the wrench flats 34 in order to continue rotating the spindle 29 and advancing the nut 10 relative to the coupling member 12 until the joint is fully assembled. The nature of the joint is such that the fully assembled position will be readily sensed by the operator when it is attained.

Referring to FIGS. 2 and 3 it will be observed that the shoulder or flange 36 on the spindle 29 engages one end of the housing portion 31 of the nut 10 while the joint is being tightened, whereas the retaining ring 32 engages the opposite end of the housing portion 31 when the joint is being loosened. Because of the forces encountered in loosening it is necessary, if a retaining ring is employed, to choose one with a broad bearing surface. However, any suitable thrust element may be used in place of the ring.

Figure 6:
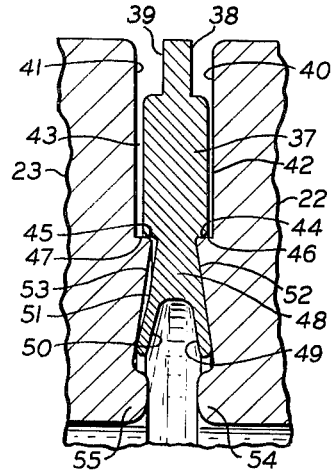
FIG. 6 is an enlarged fragmentary view of a section through the seal of FIG. 1 showing on the right side the parts in fully assembled position while showing on the left side the parts in partially assembled position.

Referring particularly to FIG. 6 it will be seen that the seal employed in the present invention is of rather novel construction. The sealing ring is made up of hardened steel and is provided with a rigid outer web portion 37. The edge of the ringe is rabbeted at 38 and 39 in order to produce a slight clearance between the ring and the ends 22 and 23 of the coupling members. This clearance is to enable a tool or an individual's fingers to get a grip on the sealing ring for removing the latter from the coupling member when a previously assembled joint is disassembled. The web portion 37 of the sealing ring rides in a channel provided by the annular recesses 40 and 41, respectively, in the ends 22 and 23. The channel thus provided is somewhat larger than the width of the web portion 37 in order to provide a slight clearance in the space 42, for example, when the parts are fully assembled. A gap will also exist in the space 43 when the coupling member 12 is in full engagement with the seal in a manner similar to that shown on the right half of FIG. 6.

Radially inwardly of the web portion 37 is provided opposing shoulders 44 and 45 which, during assembly of the joint, are piloted with a sliding fit upon the complementary shoulders 46 and 47 of the mating coupling members.

Carried radially inwardly of the web portion 37 is a rigid portion 48 followed by a pair of diverging annular resilient flange-like lip portions 49 and 50. Referring particularly to the left half of FIG. 6 it will be seen that the side wall of the rigid portion 48 between the shoulder 45 and the line of intersection 51 is of frusto-conical nature inclined at approximately 8½ to the normal to the seal axis. The outer surface of the resilient portion 50 from the line of intersection 1 to the inner periphery of the seal is also of frusto-conical configuration, but of greater inclination having a slope of approximately 15° to the normal to the seal axis.

The confronting or operative faces of the coupling members 11 and 12 are provided, respectively, with the frusto-conical bearing surfaces 52 and 53. The surface 52 extends from the shoulder 46 to an annular boss or bumper 54. The frusto-conical surface 53 extends from the shoulder 47 to a similar bumper 55. It should be noted, however, that the high point of the bearing surfaces adjacent the shoulders 46 and 47, respectively, project slightly beyond the end surface of the respective bumpers 54 and 55. This is for a reason which will be explained hereinafter.

As clearly shown in FIG. 6, the frusto-conical surfaces 52 and 53 are of the same slope as the surfaces forming the side walls of the rigid portion 48 of the seal. That is, the surfaces 52 and 53 are each inclined approximately 8½° to the normal to the axis of the respective coupling members. From the right side of FIG. 6 it will be observed that this results in deflection of the flexible lip 49 when the coupling is fully assembled until it lies in the extension of the plane of the side wall of the rigid portion 48. It should be noted that in this position of the seal every portion of the flexible lip 49 is backed up by a rigid part of the coupling member 11. In the same manner every part of the flexible lip 50 will be backed up by a rigid portion of the coupling member 12 when the joint is fully assembled.

Referring to FIG. 1 it will be observed that the nut 10 has a reduced cylindrical portion 58 adjacent the flange 18. It will also be observed that the diameter of the sealing ring is substantially equal to the diameters of the mating coupling members. Thus, as the coupling nut is advanced so that the reduced portion 58 overlies the gap between the coupling members 11 and 12, it will tend to center the sealing ring 21 with respect to the coupling members 11 and 12. This serves to insure a proper piloting fit between the sealing ring and the mating coupling members. The reduced portion 58 also makes a sliding fit with the forward portion 16 of member 11 and the end of member 12. This serves the very important function of preventing the threads on the spindle 29 from riding out of full mesh with the toothed portion 25.

As previously mentioned, the crest line on the ends of the coupling members adjacent the respective shoulders 46 and 47 represents the highest point on each member. Thus, when it is desired to disassemble the joint and remove an old seal for replacement, it is only necessary to separate the pipes carrying the coupling members 11 and 12 an amount sufficient to permit the crests of the saw tooths (the crest lines adjacent the shoulders 46 and 47) to clear the lips of the flexible flanges 49 and 50.

Figure 7:
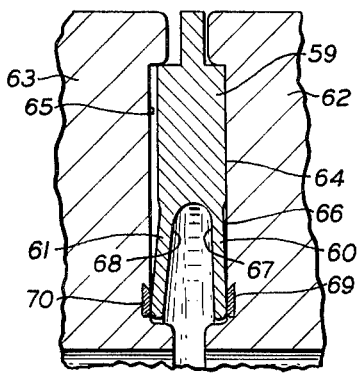
FIG. 7 is an enlarged fragmentary sectional view similar to FIG. 6 showing the details of a modified seal in accordance with the invention.

For high pressure work, the seal illustrated in FIGS. 1 to 6 is preferred. However, where the pressure to be encountered in use is not too high it is possible to use a modified seal as illustrated in FIG. 7. In this embodiment the seal is provided with a rigid radially outer annular portion 59 and a pair of radially inwardly diverging annular resilient flange-like lip portions 60 and 61. The coupling members 62 and 63 for connection to the pipe ends have their confronting faces each provided with an annular channel, respectively, 64 and 65. The channels 64 and 65 are arranged to receive the sealing ring with a close fit. The depth of each channel is chosen so that the sealing ring precludes engagement between the two members 62 and 63 when the coupling is fully assembled. The relationship between the seal and the coupling member when the parts are fully assembled is shown in the right half of FIG. 7. However, unlike the seal previously described with reference to FIGS. 1 to 6, the seal in FIG. 7 has a slight relief such as 66 associated with the flexible lip portion. This gives rise to a very slight gap between the flexible lip and the mating coupling member when the coupling is fully assembled. With the arrangement of FIG. 7 if the internal pressure should become excessive it may be found that the flexible lips 60 or 61 will shear at the point 67 or 68, respectively. This is due to the fact that the flexible lip portion is not fully backed up by the rigid surface of the mating coupling members.

With a seal of the type described herein, the maximum sealing force is developed near the inner periphery of the flexible lips, 49 and 50 in FIG. 6 and 60 and 61 in FIG. 7. Although an effective seal for most purposes can be obtained if the flexible lips are caused to engage hardened metal on the complementary surfaces of the adjacent coupling members, it has been found that improved results will be obtained, particularly for gas under high pressure, if a soft metal annulus is inlaid into the surface of the coupling members where they are engaged by the edges of the flexible sealing lips. A suitable metal for the inlay is copper.

A pair of inlay rings are shown by way of example at 69 and 70 in FIG. 7. Inlaying is accomplished by providing dovetailed annular channels in the ends of the coupling members into which are inserted rings of rectangular cross section. The rings are then coined into place, and machining cuts are taken to provide the final sealing surfaces in the channels 64 and 65. It will be observed from the right half of FIG. 7 that the inlay 69 is almost completely obscured by the flexible lip 60. This prevents the inlay material from extruding out of the dovetailed channel. As a consequence, it has been found that the very high contact pressures developed upon final assembly only produce slight impressions into or alteration of the surface of the copper inlay. The width of such impressions or "footprints" in typical couplings embodying the invention has been observed to be about 0.020 inch. By piloting the seals into position with respect to the coupling members it is possible to cause the flexible lip of a new seal to engage the same impression or "footprint" previously created in the surface of the copper inlay. It has been found that piloting the seal is also advantageous where the inlay is not used because the high unit loading of the flexible seal is sufficient to cause a "footprint" in a hard metal surface.

Although not illustrated, soft metal inlays may be added to the structure of FIGS. 1 to 6 or be removed from the embodiment of FIG. 7.

With the seal shown in FIG. 6, complete assembly of the joint will be detected when the rigid portion 48 is encountered by the mating coupling members. With the modification of FIG. 7 the final position of the joint will be determined when the coupling members engage the portion 59 of the seal.

When describing FIG. 1 it was pointed out that the flanged coupling 11 had a reduced portion 17 forming a part of the flange 15. The reason for this reduced portion is to allow the coupling nut a degree of eccentric freedom when the portion 58 thereof coincides with the portion 17 on the member 11. This facilitates starting the threads of the nut onto the threads 20 of the coupling member 12 should there be some slight misalignment or cocking between the members 11 and 12.

For convenience, it will be found desirable to use multiple threads on the flanged nut and on the threaded coupling member 12. It is also desirable to employ multiple threads on the spindle 29.

Although a continuous gear ring 25 has been shown, it is contemplated that a toothed segment may be used to permit faster hand assembly before the spindle is engaged. Furthermore, it should be apparent that the metallic seal may be replaced by known resilient seals of rubber or the like, particularly when it is realized that the coupling mechanism is not dependent upon the use of a seal whose axial dimension is critical.

When a multiple thread is used in the coupling described with reference to FIGS. 1 to 6 it is possible to position the coupling nut 10 in more than one angular starting position and thereby locate to a certain extent the end of the spindle 29 which is to be engaged by the wrench. By proper choice of the thread lead it is possible to minimize the amount of rotation of the nut 10 after the spindle 29 meshes with the gear element 25. However, in practice the spindle may have to be followed around the pipe with a wrench for as much as 180° of rotataion. There are occasions when this may prove objectionable. In such case, resort may be had to the embodiment of the invention shown in FIG. 8.

Figure 8:
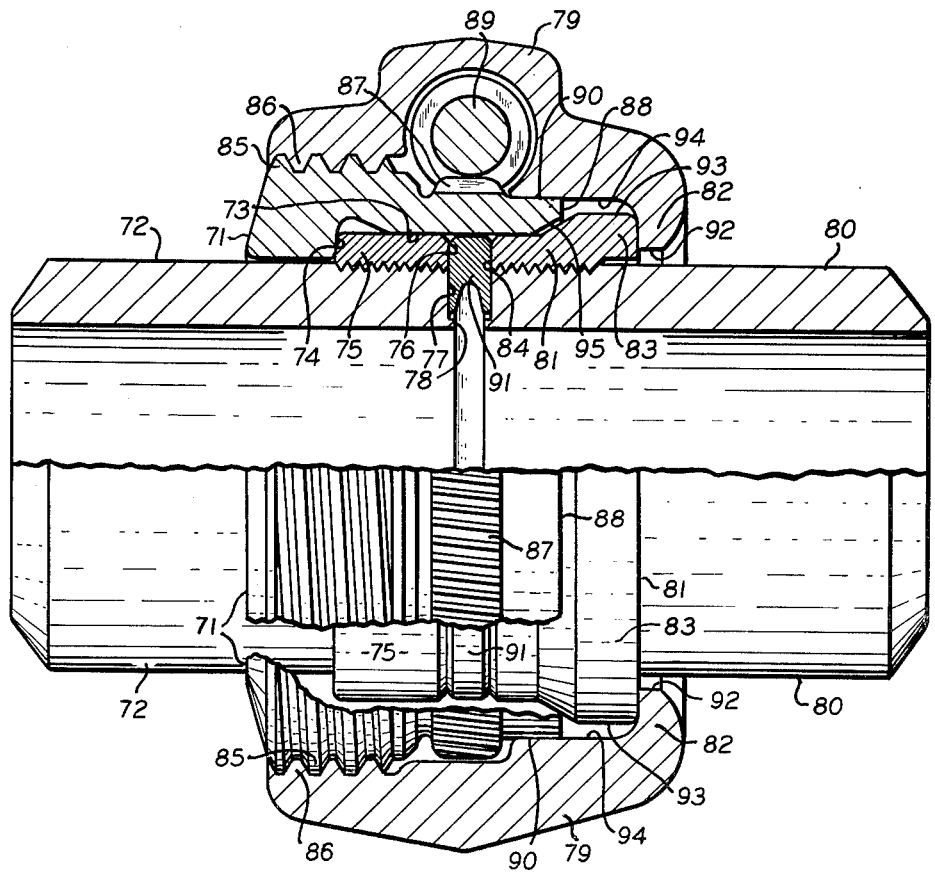
FIG. 8 is a view similar to FIG. 1 showing a modification of the invention.

As seen in FIGURE 8, a hollow cylindrical member 71 is constructed and arranged for mounting on an end of a stub pipe or welding hub 72 for rotation relative thereto. In the alternative the member 71 may be mounted directly on the end of the pipe to be coupled.

The member 71 is provided with a counterbore 73 terminating in a shoulder 74. An internally threaded collar 75 is provided for threaded installation on the end of the hub 72 within the member 71 where it is engageable by the shoulder 74. After installation of the collar 75, it is presently preferred to machine the end surface 76 in order to render it flush with the previously machined sealing face 77 on the hub 72. The annular lip or protuberance 78 functions as a bumper or guard to afford a degree of protection for the surface 77.

If the collar 75 is installed directly on the end of a pipe, then it may be preferable to form the sealing surface 77 and face the end of the collar at the same time.

A flanged coupling nut 79, similar to the nut 10 of FIG. 1, is constructed and arranged for mounting on an end of a second stub pipe or welding hub 80 for rotation relative thereto. A second internally threaded collar 81 is provided for threaded installation on the end of the hub 80 within the nut 79 where it is engageable by the flange 82 on the nut to couple the nut to the hub. The collar 81 has an enlarged diameter at its end 83 which is engageable by the nut for a reason to be described below.

The ends of the hub 80 and of the collar 81 are machined at 84 to provide a sealing surface identical to that provided on the opposite pipe end, as shown.

The cylindrical member 71 is arranged, as shown, to telescope within the nut 79 for drawing the hubs together and, thereby, coupling any pipes attached thereto. The member 71 is provided with external threads 85 over a portion of its length which threadedly engage the internal threads 86 on the nut 79.

A toothed portion 87 is disposed about the cylindrical member 71 between the threads 85 and the end 88 in much the same manner as the gear ring 25 in FIG. 1. However, in the FIG. 8 construction, it is convenient to form the gear teeth integral with the member 71 rather than as a sparate part.

A transversely disposed spindle 89 threaded over its mid-section is journaled in the nut 79 remote from the threaded end for tangential meshing with the toothed portion 87 when the nut and cylindrical member 71 are threadedly engaged. The spindle extends to the exterior of the nut and may be secured therein as well as provided with tool engaging means in the same manner as described with reference to FIGS. 1 to 6.

The end 88 of the cylindrical member 71 is provided with a cylindrical portion 90 arranged to make a sliding fit with the nut 79, as shown. This cooperation between member 71 and nut 79 serves to prevent the threaded section of the spindle from riding out of mesh with the toothed portion 87.

Both of the collars 75 and 81 are provided with an external cylindrical surface which engages with a sliding fit, as shown, the internal cylindrical wall of the counterbore 73. This arrangement serves to pilot the hubs or pipe ends into alignment as the coupling is assembled.

The counterbore in member 71 also operates to center and pilot the annular metal seal ring 91 into position. Ring 91 may be similar to the ring described with reference to FIG. 7; however, the rabbeting of the peripheral portion seen in FIGS. 6 and 7 can be eliminated. It is presently preferred to make the external diameter of the ring 91 slightly smaller than the external diameter of collar 75.

An arrangement was described with reference to the embodiment of FIGS. 1 to 6 for accommodating initial misalignment of the pipe ends. In FIG. 8, this is accomplished by providing an enlarged opening 92 in the in the flange 82 of the nut 79 and concomitant enlargement of the collar 81 as previously noted. Also note the clearance between surface 93 on the collar 81 and the surface 94 on the nut 79. It should be apparent that a certain amount of cocking can be tolerated between the hub 80 and the nut 79 until the collar 81, guided by the tapered entrance 95, is centered within the counterbore 73 of the member 71.

It should be clear from the foregoing decription that the joint of FIG. 8 functions in substantially the same manner as the joint in FIGS. 1 to 6. However, when the FIG. 8 embodiment is assembled, the angular position of the nut 79 can remain fixed while the spindle is being manipulated for final tightening. It may be desirable to facilitate rotation of member 71 that a suitable lubricant be applied to the shoulder 74. In the other hand the surface of the nut flange which engages collar 81 may be roughened, or the collar end may be riughened, or both.

Because of the free movement of member 71 and nut 79 a single rather than a multiple thread may be used for threads 85 and 86. To prevent loosening of the collars 75 and 81 they can be provided with threads of opposite hand to the threads 85 and 86, or they can be pinned or some other known technique may be employed. Under certain conditions the collars may be formed integral with the ends of the hubs or they may be produced by upsetting the ends of a length of pipe.

Having described the details of certain preferred embodiments of the invention, it will be understood by those skilled in the art that numerous changes may be made therein without departing from the true spirit of the invention as defined in the appended claims.

What is claimed is:

1. In a pipe coupling having a flanged nut mounted on a flanged coupling member for drawing the latter into sealing position relative to an externally threaded coupling member, the improvement comprising a spindle with a threaded section intermediate its ends journaled in said nut with its axis generally at right angles to the axis of the nut and displaced from the nut axis so as to dispose said threaded section for tangential engagement with an unthreaded portion of said threaded coupling member, said unthreaded portion being provided with a circumferentially disposed toothed portion for meshing with said threaded section of the spindle when said nut and threaded coupling member are threadedly engaged, a portion of at least said threaded coupling member in the vicinity of said toothed portion being disposed for making a sliding fit with the nut to prevent the threaded section of the spindle from riding out of mesh with said toothed portion, and tool engaging means on an end of said spindle protruding from said nut for enabling the spindle to be rotated to cause said nut and threaded coupling member to turn in opposite directions relative to eath other for alternatively tightening or loosening the coupling.

2. A pipe coupling comprising a member for connection to each pipe end, an enlarged flange on one member, a flanged nut mounted on said one member with the flange of the nut behind said enlarged flange for drawing said one member into sealing position relative to the other member, said other member having one end for telescoping within said nut into sealing position relative to said one member, external threads on said other member spaced from said one end thereof and arranged for threaded engagement with said nut, a toothed portion circumferentially disposed about said other member between said external threads and said one end thereof, and a transversely disposed spindle threaded over its mid-section and journaled in said nut near the flange thereof for tangential meshing with said toothed portion when said nut and other member are threadedly engaged, said spindle extending to the exterior of said nut and having tool engaging means for enabling it to be rotated to cause said nut and other member to turn in opposite directions relative to each other for alternatively tightening or loosening the coupling.

3. A pipe coupling according to claim 2, wherein said toothed portion is spaced from said external threads said other member a distance less than the spacing of said spindle from the threaded end of said nut such that said nut threadedly engages said other member during assembly before said spindle engages said soothed portion.

4. A pipe coupling according to claim 2, wherein a portion of at least said other member in the vicinity of said toothed portion is disposed for making a sliding fit with the nut to prevent the threaded section of the spindle from riding out of mesh with said toothed portion.

5. A pipe coupling according to claim 2, wherein the enlarged flange on said one member is provided with a cylindrical portion nearest the end and a portion of reduced diameter directly behind said cylindrical portion, said cylindrical portion being arranged to make a sliding fit with said nut when the joint is assembled, and said reduced portion cooperating with said nut during assembly to permit a degree of eccentric freedom between the nut and said one member during the initial phase of assembling the joint.

6. A pipe coupling comprising a member for connection to each pipe end, a coupling nut mounted for rotation on one of said members for drawing the latter into sealing position relative to the other member, said other member having one end for telescoping within said nut into sealing position relative to said one member, external threads on said other member spaced from said one end thereof and arranged for threaded engagement with said nut, a toothed portion circumferentially disposed about said other member between said external threads and said one end thereof, and a transversely disposed spindle threaded over its mid-section and journaled in said nut remote from the threaded end thereof for tangential meshing with said toothed portion when said nut and other member are threadedly engaged, said spindle extending to the exterior of said nut and having tool engaging means for enabling it to be rotated to cause said nut and other member to turn in opposite directions relative to each other for alternatively tightening or loosening the coupling.

7. A pipe coupling according to claim 6, wherein said toothed portion is spaced from said external threads on said other member a distance less than the spacing of said spindle from the threaded end of said nut such that said nut threadedly engages said other member during assembly before said spindle engages said toothed portion.

8. A pipe coupling according to claim 6, further comprising a hard metal sealing ring with a rigid radially outer annular portion and a pair of radially inwardly diverging annular resilient flange-like lip portions, said members for connection to the pipe ends having their confronting faces each provided with an annular channel for receiving said ring with a close fit, the depth of said channels being chosen such that said ring precludes engagement between said two members, and a soft metal annulus narrower than said channels inlaid into the bottom of each of said channels adjacent the radially inner wall thereof for engaging the radially inner portion of said respective lip portions.

9. A pipe coupling according to claim 6, further comprising a metal sealing ring with both rigid and resilient sealing surfaces for disposition between said two members, said members and said ring being provided with complementary surfaces for piloting the ring into predetermined position relative to said members, the confronting faces of said two members each being stepped to provide a radially outwardly facing cylindrical surface concentric with the respective axis of the members located intermediate the extreme inner and outer surfaces of the wall constituting the member, and said ring being complementally stepped on both sides thereof to provide radially inwardly facing cylindrical surfaces concentric with its axis, said cylindrical surfaces constituting the piloting surfaces aforesaid.

10. A pipe coupling according to claim 9, wherein said two members are each provided with frustoconical concave sealing surfaces radially inwardly of said outwardly facing cylindrical surfaces, and said ring is provided with frustoconical convex sealing surfaces radially inwardly of said inwardly facing cylindrical surfaces, said concave and convex surfaces being arranged for mutually sealing engagement.

11. A pipe coupling according to claim 10, wherein said convex sealing surfaces on said ring terminate radially inwardly in a pair of diverging annular resilient flange-like portions of greater conicity than that of the remainder of the sealing surfaces.

12. A pipe coupling according to claim 6, wherein said one end of said other member, and the end of said one member within the coupling nut are each provided with a cylindrical portion for making a sliding fit with said nut when the joint is assembled to prevent the threaded section of the spindle from riding out of mesh with said toothed portion.

13. A pipe coupling according to claim 6, further comprising a hard metal sealing ring with both rigid and resilient sealing portions for disposition between said two members, said members and said ring being provided with complementary surfaces for piloting the ring into predetermined position relative to said members, and soft metal material disposed for compression between said resilient sealing portions of the hard metal sealing ring and said two members upon assembly of the coupling.

14. A pipe coupling according to claim 6, further comprising a hard metal sealing ring with both rigid and resilient sealing portions for disposition between the confronting ends of said two members, the diameter of said ring being related to the internal diameter of that portion of the coupling nut which overlies the sealing ring when the coupling is fully assembled for centering the sealing ring with respect to the two members as the coupling is assembled.

15. A pipe coupling comprising in combination an externally threaded pipe end, a flanged pipe end, a flanged nut rotatably mounted on said flanged pipe end and engageable with the threads on said threaded pipe end for drawing the two pipe ends into sealing position relative to one another, a circumferentially disposed gear toothed element joined to said externally threaded pipe end adjacent the threads thereon, threaded operating means rotatably mounted in the nut for tangential engagement with said toothed element when said nut and externally threaded pipe end are threadedly engaged for turning the nut and the threaded pipe end in opposite directions relative to each other to either tighten or loosen the coupling, and means for preventing said operating means from riding radially out of engagement with said toothed element.

16. A pipe coupling comprising in combination a hollow cylindrical member adapted to be coupled to the end of a pipe, said member being threaded externally over a portion of its length, a flanged nut, means engageable by the flange on the nut for joining said nut to the end of another pipe for rotation with respect thereto, said nut having internal threads engageable with the threads on said cylindrical member for coupling the two pipes together, a circumferentially disposed gear toothed element joined to said cylindrical member adjacent the threads thereon, threaded operating means rotatably mounted in the nut for tangential engagement with said toothed element when said nut and cylindrical member are threadedly engaged for turning the nut and the cylindrical member in opposite directions relative to each other to either tighten or loosen the coupling, and means for preventing said operating means from riding radially out of engagement with said toothed element.

17. A pipe coupling comprising in combination a coupling nut, means for joining said nut to the end of a pipe for rotation with respect thereto, a hollow cylindrical member adapted to be coupled to the end of another pipe, said cylindrical member being arranged to telescope within said nut into coupled position relative thereto, external threads on said cylindrical member spaced from said one end thereof and arranged for threaded engagement with said nut, a toothed portion circumferentially disposed about said cylindrical member between said external threads and said one end thereof, and a transversely disposed spindle threaded over its mid-section and journaled in said nut remote from the threaded end thereof for tangential meshing with said toothed portion when said nut and cylindrical member are threadedly engaged, said spindle extending to the exterior of said nut and having tool engaging means for enabling it to be rotated to cause said nut and cylindrical member to turn in opposite directions relative to each other for alternatively tightening or loosening the coupling.

18. A pipe coupling comprising in combination a hollow cylindrical member which is constructed and arranged for mounting on an end of a first pipe for rotation relative thereto, said member having an internal shoulder formed thereon, a first internally threaded collar for threaded installation on said end of the first pipe within said cylindrical member where it is engageable by said shoulder to couple said cylindrical member to the first pipe, a flanged coupling nut constructed and arranged for mounting on an end of a second pipe for rotation relative thereto, a second internally threaded collar for threaded installation on said end of the second pipe within said nut where it is engageable by the flange on the nut to couple said nut to the second pipe, said cylindrical member being arranged to telescope within said nut into coupled position relative thereto for drawing said pipes together, external threads on said cylindrical member spaced from said one end thereof and arranged for threaded engagement with said nut, a toothed portion circumferentially disposed about said cylindrical member between said external threads and said one end thereof, and a transversely disposed spindle threaded over its mid-section and journaled in said nut remote from the threaded end thereof for tangential meshing with said toothed portion when said nut and cylindrical member are threadedly engaged, said spindle extending to the exterior of said nut and having tool engaging means for enabling it to be rotated to cause said nut and cylindrical member to turn in opposite directions relative to each other for alternatively tightening or loosening the coupling.

19. A pipe coupling according to claim 18, wherein said one end of said cylindrical member is provided with a cylindrical portion for making a sliding fit with said nut when the coupling is assembled to prevent the threaded section of the spindle from riding out of mesh with said toothed portion.

20. A pipe coupling according to claim 19, wherein both of said collars are provided with an external cylindrical surface which engages with a sliding fit an internal cylindrical surface on said cylindrical member when the coupling is assembled to pilot the pipes to be coupled into aligned position.

References Cited by the Examiner

UNITED STATES PATENTS

| | | | |
|---|---|---|---|
| 508,765 | 11/1893 | Rouse | 285—336 |
| 1,071,235 | 8/1913 | Hutton | 285—329 |
| 1,097,508 | 5/1914 | Bailey | 285—39 |
| 1,194,236 | 8/1916 | Richards. | |
| 1,242,568 | 10/1917 | Loughridge | 285—414 |
| 1,831,956 | 11/1931 | Harrington. | |
| 2,278,848 | 4/1942 | Hamer | 138—94.3 |
| 2,283,974 | 5/1942 | Dillion. | |
| 2,417,025 | 3/1947 | Volpin | 285—354 |
| 2,664,918 | 1/1954 | Hamer. | |
| 2,863,679 | 12/1958 | Dunbar | 285—336 |

FOREIGN PATENTS

| | | |
|---|---|---|
| 909,806 | 1/1946 | France. |
| 995,398 | 8/1951 | France. |
| 1,222,943 | 1/1960 | France. |
| 707,988 | 4/1954 | Great Britain. |

CARL W. TOMLIN, *Primary Examiner.*